United States Patent [19]

Schwerzel et al.

[11] Patent Number: 4,769,420

[45] Date of Patent: Sep. 6, 1988

[54] BINDER WHICH IS RENDERED WATER-DILUTABLE BY PROTONATION WITH AN ACID, FROM CARBOXYL TERMINATED BUTADIENE/ACRYLONITRILE COPOLYMERS

[75] Inventors: Thomas Schwerzel, Ludwigshafen; Rolf Osterloh; Eberhard Schupp, both of Gruenstadt; Klaas Ahlers, Muenster, all of Fed. Rep. of Germany

[73] Assignee: BASF Lacke + Farben Aktiengesellschaft, Muenster, Fed. Rep. of Germany

[21] Appl. No.: 934,562

[22] Filed: Nov. 25, 1986

[30] Foreign Application Priority Data

Dec. 3, 1985 [DE] Fed. Rep. of Germany ....... 3542594

[51] Int. Cl.$^4$ .......................... B05D 1/28; B05D 7/02
[52] U.S. Cl. .................... 525/113; 528/113; 528/341
[58] Field of Search ............... 525/113; 528/113, 341

[56] References Cited

U.S. PATENT DOCUMENTS

| | | | |
|---|---|---|---|
| 4,107,116 | 8/1978 | Riew | 528/112 |
| 4,119,592 | 10/1978 | Murphy | 528/112 |
| 4,129,670 | 12/1978 | Riew | 528/113 |
| 4,251,415 | 2/1981 | Nakada et al. | 525/111 |
| 4,253,930 | 3/1981 | Tsuchiya et al. | 204/181.7 |
| 4,260,700 | 4/1981 | Cassutt | 525/113 |
| 4,447,579 | 5/1984 | Takagi | 525/113 |
| 4,486,571 | 12/1984 | Holubka | 525/110 |
| 4,557,814 | 12/1985 | Schupp et al. | 525/510 |
| 4,568,729 | 2/1986 | Schupp et al. | 428/416 |

FOREIGN PATENT DOCUMENTS 0040867 2/1983 European Pat. Off.

*Primary Examiner*—Earl Nielsen
*Assistant Examiner*—Frederick Krass
*Attorney, Agent, or Firm*—Keil & Weinkauf

[57] ABSTRACT

Binders which are rendered water-dilutable by protonation with an acid, a process for their preparation and their use.

These binders are obtainable by reacting a (A) Reaction product of a
 (a) carboxyl-containing component, consisting of a
  (a1) carboxyl-containing butadiene/acrylonitrile copolymer having a molecular weight of from 500 to 8,000, if necessary as a mixture with
  (a2) a dicarboxylic acid which differs from (a1) and, if appropriate,
  (a3) a monocarboxylic acid and
 (b) a diprimary and/or primary/secondary amine, with the proviso that from 0.7 to 5 moles of the said amine are used per mole of carboxyl groups of component (a), with one or more (B) epoxy resins having a mean molecular weight from 300 to 6,000 and containing on average from 1.5 to 3.0 epoxide groups per molecule and, if required, (C) an aliphatic or cycloaliphatic secondary amine.

In combination with a crosslinking agent, they are useful as coating materials, in particular for cathodic electrocoating.

7 Claims, No Drawings

BINDER WHICH IS RENDERED WATER-DILUTABLE BY PROTONATION WITH AN ACID, FROM CARBOXYL TERMINATED BUTADIENE/ACRYLONITRILE COPOLYMERS

The present invention relates to a binder which is rendered water-dilutable by protonation with an acid, its preparation and its use, in particular for cathodic electrocoating.

The use of polybutadiene and copolymers of butadiene and other vinyl monomers for the preparation of surface coating systems for cathodic electrocoating has already been described. For example, German Laid-Open Application DOS No. 2,926,001 relates to coating systems in which the soft segment (butadiene-containing copolymer) is introduced into the film-forming component by reacting a polymer of a conjugated diene or a copolymer of a conjugated diene and a vinyl monomer (possessing terminal carboxyl groups in each case) with an epoxy resin.

German Laid-Open Application DOS No. 2,928,769, the content of which corresponds to U.S. Pat. No. 4,253,930 or Japanese Pat. No. 54 097 632, describes a resin which is obtained by reacting an epoxide-containing compound and a carboxyl-containing butadiene/acrylonitrile copolymer in a ratio of one epoxide equivalent of the first-mentioned compound to about 0.2–0.7 equivalent of the free carboxyl groups of the copolymer with an amino-containing compound and an isocyanate-containing compound in which some of the groups are blocked.

In both German Laid-Open Application DOS No. 2,926,001 and German Laid-Open Application DOS No. 2,928,769, carboxyl-containing polybutadiene or a copolymer of carboxyl-containing butadiene with a vinyl monomer is employed, so that the carboxyl groups react with the epoxide groups with formation of $\beta$-hydroxyester structural units. These $\beta$-hydroxyesters are known to be reactive esters, and this manifests itself in, for example, ease of hydrolysis.

U.S. Pat. No. 4,486,571 describes a coating material which is obtained by first reacting a butadiene/acrylonitrile copolymer possessing terminal secondary amino groups with monoepoxides, and then reacting the product with diepoxides. This epoxide-modified butadiene/acrylonitrile copolymer is then reacted with polyfunctional alcohols. This resin is used in combination with an amine/formaldehyde resin, as a coating material. Furthermore, this U.S. patent states that, by protonating the coating material, a dispersion capable of cathodic deposition can be obtained. According to U.S. Pat. No. 4,486,571, the protonated nitrogen atoms and the binder can be introduced only via the butadiene/acrylonitrile copolymer possessing terminal amine groups. After neutralization, however, electrocoating baths prepared from such coating materials have a low bath pH.

It is an object of the present invention to use butadiene/acrylonitrile copolymers in the binder of the surface-coating system in order to prepare dispersions from which it is possible to obtain coatings which can be deposited cataphoretically, are distinguished by high flexibility and good corrosion protection properties, and at the same time have a good property profile in terms of dispersion stability and performance characteristics, eg. little plant corrosion.

We have found that this object is achieved, according to the invention, by a binder which is obtained by reacting primary or secondary amidoamines (A) and amines (A, C), which may be present in excess in the reaction product (A) or are added separately (C), with epoxy resins.

The primary or secondary amidoamines are obtained by reacting carboxyl-containing butadiene/acrylonitrile copolymers and, if required, dicarboxylic acids and monocarboxylic acids with polyfunctional amines.

The present invention relates to a binder which is rendered water-dilutable by protonation with an acid, and which is obtainable by reacting a (A) Reaction product of a
  (a) carboxyl-containing component, consisting of a
    (a1) carboxyl-containing butadiene/acrylonitrile copolymer having a molecular weight of from 500 to 8,000, if necessary as a mixture with
    (a2) a dicarboxylic acid which differs from (a1) and has a molecular weight of from 90 to 1,000 and, if appropriate,
    (a3) a monocarboxylic acid having a molecular weight of from 140 to 500 and
  (b) a diprimary and/or primary/secondary amine, with the proviso that from 0.7 to 5 moles of the said amine are used per mole of carboxyl groups of component (a), with one or more
(B) epoxy resins having a mean molecular weight from 300 to 6,000 and containing on average from 1.5 to 3.0 epoxide groups per molecule and, if required,
(C) an aliphatic or cycloaliphatic secondary amine.

A preferably used component (A.a1) is a carboxyl-containing butadiene/acrylonitrile copolymer which contains, as copolymerized units, from 5 to 45% by weight of acrylonitrile units and possesses on average from 1.5 to 2.5 carboxyl groups in the copolymer molecule, in particular a copolymer which carries terminal carboxyl groups.

Dicarboxylic acids which are preferred as component (A.a2) are dimerized $C_{12}$–$C_{24}$-fatty acids (dimer fatty acids). Monocarboxylic acids which are preferred as component (A.a3) are saturated or unsaturated $C_{10}$–$C_{24}$-fatty acids.

Preferred secondary amines (C) are dialkylamines which contain 2 to 18 carbon atoms and may furthermore possess functional groups. Thus, the alkyl chains of the secondary amine (C) may carry primary amino groups which may or may not have been converted to the ketimine.

The present invention furthermore relates to a process for the preparation of the novel binders, wherein from 0.1 to 0.8 carboxyl group of the carboxyl-containing component (A.a) is used per epoxide group of the epoxy resin (B); the primary amino groups can be converted to Schiff's bases with a ketone, prior to reaction with the epoxy resin.

The present invention furthermore relates to the use of the novel binder which is rendered water-dilutable by protonation with an acid, in the form of an aqueous dispersion which additionally contains crosslinking agents and, if appropriate, pigments, organic solvents and/or further assistants, as a coating material, as well as its use for the cathodic electrocoating of electrically conductive substrates, and coating materials of this type which, in addition to the novel binder, contain, as a crosslinking agent, a polyvalent blocked isocyanate, an aminoplast or phenoplast resin, a polyaminomethylated polyphenol, a crosslinking agent which cures via ester aminolysis and/or transesterification, or a urea condensate.

The present invention also relates to a process for the production of coatings by cathodic electrocoating from an electrocoating bath which contains a novel binder capable of protonation with an acid and may additionally contain pigments, organic solvents and/or further assistants, and an article which is provided with a coating and obtained by applying and baking a coating material which contains the novel binder.

In contrast to German Laid-Open Applications DOS No. 2,926,001 and DOS No. 2,928,769, the formation of reactive β-hydroxyester structural units is avoided in the preparation of the novel binders.

The use of polyols, as described in U.S. Pat. No. 4,486,571, instead of amines, which are either already present in the reaction product (A) or added separately under (C), would lead to crosslinking in the case of the binders according to the invention.

The use of amines instead of polyols also has the advantage that nitrogen atoms capable of protonation are additionally introduced. Consequently, stable dispersions are obtained after neutralization of only from 25 to 60%, advantageously from 30 to 50%, of all basic nitrogen atoms of the binder. Because of the low degree of neutralization, it is possible to prepare electrocoating baths which have a high pH of from 6.5 to 8.5, preferably from 6.8 to 8.0. As a result, the materials required for bath control suffer hardly any corrosion.

Regarding the components of the novel binders, the following may be stated specifically:

(A.a1)

The carboxyl-containing butadiene/acrylonitrile copolymer (A.a1) is a copolymer which is prepared in a conventional manner from butadiene and acrylonitrile and additionally contains carboxyl groups. The acrylonitrile content of the copolymer is in general from 5 to 40, and preferably from 15 to 35, % by weight, and the butadiene content is from 95 to 60, preferably from 85 to 65, % by weight. On average, from 1.5 to 3.0, preferably from 1.5 to 2.5, free carboxyl groups are present per molecule, these groups preferably being located at the ends of the chains. The molecular weight of the copolymer is in general from 500 to 8,000, preferably from 2,500 to 6,000.

For example, reactive liquid polymers commercially available from B.F. Goodrich are particularly preferably used. Particular examples of these are the types HYCAR ® 300 ×15 CTBN, HYCAR 1300 ×8 CTBN and HYCAR 1300 ×13 CTBN, containing 10%, 18% and 26% of acrylonitrile.

(A.a2)

Examples of suitable dicarboxylic acids (A.a2) having molecular weights of from 90 to 1,000 are those of 6 to 50 carbon atoms, eg. glutaric acid, adipic acid, pimelic acid, suberic acid, sebacic acid and higher homologs, as well as dimerized $C_{12}$–$C_{24}$ fatty acids, eg. $C_{36}$-dicarboxylic acids.

(A.a3)

Examples of suitable monocarboxylic acids (A.a3) having molecular weights of from 140 to 500 are those of 8 to 30, preferably more than 12, carbon atoms, eg. palmitic acid and stearic acid, as well as unsaturated carboxylic acids, such as oleic acid, and polyunsaturated fatty acids, such as linoleic acid and linolenic acid, or mixtures of these.

(A.b)

Examples of suitable diprimary amines are ethylenediamine, 1,3-diaminopropane, 1,4-diaminobutane, 1,6-diaminohexane, 2-methylpentane-1,5-diamine, 4,7-dioxadecane-1,10-diamine, 4,9-dioxadecane-1,12-diamine, 4,4'-diaminodicyclohexylmethane and 2-(3-aminopropyl)cyclohexylamine and mixtures of these. Examples of suitable primary/secondary amines are aminoethylmethylamine, aminopropylmethylamine and aminoethylethylamine. However, amines which additionally carry reactive groups which do not react with epoxides under mild conditions, eg. aminoethylethanolamine, aminoethylpropanolamine or aminopropylethanolamine, are also suitable for amidoamine formation.

(B)

Any epoxide compounds can be used as epoxy resins (B), provided that they have a mean molecular weight $\overline{M}_n$ of from 300 to 6,000 and contain on average from 1.5 to 3.0 epoxide groups per molecule, compounds possessing two epoxide groups per molecule being preferred.

Epoxy resins which have mean molecular weights $\overline{M}_n$ of from 350 to 5,000, in particular from 350 to 2,000, are preferred. Examples of particularly preferred epoxy resins are glycidyl ethers of polyphenols which contain on average two or more phenolic hydroxyl groups per molecule and can be prepared in a conventional manner by etherification with epihalohydrin in the presence of an alkali. Examples of suitable polyphenols are 2,3-bis-(4-hydroxyphenyl)-propane, 4,4'-dihydroxybenzophenone, 1,1-bis-(4-hydroxyphenyl)-ethane, 1,1-bis-(4-hydroxyphenyl)isobutane, 2,2-bis-(4-hydroxy-tert.-butylphenyl)-propane, bis-(2-hydroxynaphthyl)-methane and 1,5-dihydroxynaphthalene. In some cases, it is desirable to use aromatic epoxy resins having a higher molecular weight. These are obtained by reacting the above diglycidyl ethers with a polyphenol, eg. 2,2-bis-(4-hydroxyphenyl)-propane, and then further reacting the resulting products with epichlorohydrin to prepare polyglycidyl ethers. Mixtures of the stated epoxy resins are all suitable.

(C)

Suitable secondary amines (C), which may be concomitantly used, are diethylamine, dipropylamine, dibutylamine and ethylcyclohexylamine, but preferably alkanolamines, eg. methylethanolamine, ethylethanolamine, methylisopropanolamine, diethanolamine or diisopropanolamine, or mixtures of these.

Where diprimary amines (A.b) are used, it may be advantageous in some cases, after the reaction with the carboxyl-containing components with amidoamine formation, if any primary amino functions still present are converted to a Schiff's base with a suitable ketone. The consequence of this is that these primary amines blocked in this manner behave as secondary amines toward epoxides, as described in German Laid-Open Application DOS No. 3,325,061.

Examples of suitable ketones for conversion to the ketimine are acetone, methyl ethyl keton, methyl propyl ketone, methyl isopropyl ketone, methyl isobutyl ketone, methyl isoamyl ketone, diethyl ketone, dipropyl ketone and cyclohexanone. Acetone, methyl ethyl ketone and methyl isobutyl ketone are particularly preferred.

The ratios of components (A), (B) and (C) can be varied within wide limits which should be chosen so that, after the reaction, all epoxide groups present have been able to react.

Specifically, it is advantageous to use from 0 to 15, preferably from 0.5 to 8, moles of dicarboxylic acid and monocarboxylic acid per mole of the butadiene/acrylonitrile copolymer possessing terminal carboxyl groups.

The reaction of the carboxyl-containing components (A.a) with the diprimary or primary/secondary amines (A.b) is carried out in the presence or absence of a solvent, preferably one which forms an azeotropic mixture with water, eg. benzene, toluene or xylene, so that water formed during the reaction can be removed.

If the amidoamine formation is also to be followed by a step in which primary amino groups are converted to the ketimine, the selected ketone may be added to the reaction mixture, which may contain a solvent. Once again, the water formed is removed by a distillation. The amount of epoxide resin (B) used is chosen so that the ratio of epoxide groups (B) to carboxyl groups of component (A.a) is from 10:1 to 10:8, preferably from 10:.2 to 10:7. If secondary amines are used in addition, the ratio of secondary amino groups (C) to epoxide groups (B) should be from 0:10 to 9:10, preferably from 0:10 to 7:10.

The reaction of (A) with (B) and, where relevant, (C) is carried out in the presence or absence of the solvents used under (A), at from 40 to 180° C., preferably from 70° to 130° C.

The binders obtained in this reaction have amine numbers of from 40 to 250, preferably from 50 to 150, mg of KOH/g of solid.

The binders can be protonated using inorganic or organic acids. Formic acid, acetic acid, propionic acid, lactic acid and phosphoric acid are particularly suitable for this purpose.

Examples of suitable crosslinking agents for the novel binders are aminoplast resins, such as urea/formaldehyde resins, melamine resins or benzoguanamine resins, blocked isocyanate crosslinking agents, crosslinking agents which cure via ester aminolysis and/or transesterification and possess on average two or more activated ester groups per molecule, eg. $\beta$-hydroxyalkyl ester crosslinking agents according to European Pat. No. 40,867, and carbalkoxymethyl ester crosslinking agents according to German Patent Application No. P 32 33 139.8 and urea condensates, as described in German Laid-Open Application DOS No. 3,311,514.

The ratio of binder to crosslinking agent depends on the type and number of crosslinking groups in the binder and crosslinking agent. In general, the ratio of binder to crosslinking agent is from 1:9 to 9:1, preferably from 1:1 to 9:1, particularly preferably from 1.5:1 to 4:1, based on parts by weight.

In addition to the crosslinking agents, other substances, such as pigments, assistants, solvents and curing catalysts, may be added to the binder. The coating materials prepared in this manner can be applied to substrates such as wood, glass, plastic or metal by a conventional method, such as spraying, immersion, casting or knife-coating. The coatings are cured at from 80° to 220° C. for from 3 to 40 minutes, depending on the type of crosslinking agent.

For cathodic electrocoating, the solids content of the electrocoating bath is generally brought to 5-45%, preferably 10-30%. Deposition is usually effected at from 15° to 40° C. for from 30 to 360 seconds. The pH of the bath is generally from 4.5 to 9.0, preferably from 5.0 to 8.0, in particular from 6.8 to 8.2. The deposition voltage is usually from 50 to 500 volt, and the article to be coated is made the cathode. The deposited film is baked at >90° C., if necessary after washing.

Binder 1

148 g of a carboxyl-containing butadiene/acrylonitrile copolymer having an acrylonitrile content of 27% by weight, a carboxyl content of 2.4% by weight, a functionality of 1.85 and a molecular weight of 3,500, 28.6 g of a dimerized $C_{18}$ fatty acid (Pripol 1014), 23 g of stearic acid and 58 g of hexamethylenediamine in 110 g of toluene were heated to 160° C. This temperature was maintained until water of reaction was no longer formed. The mixture was left to cool, 100 g of methyl isobutyl ketone were added, the mixture was heated and the resulting water of reaction was separated off. Thereafter, 686 g of a 70% strength by weight toluene solution of an anhydrous diglycidyl ether of 2,2-bis-(4-hydroxyphenyl)-propane and epichlorohydrin, having an equivalent weight of 485, 52.5 g of diethanolamine and 23 g of toluene were added, and stirring was continued for 4 hours at 100° C. The solids content was brought to 70% by weight.

Binder 2

184 g of the carboxyl-containing butadiene/acrylonitrile copolymer used in binder 1, 62.9 g of a dimerized $C_{18}$ fatty acid, 23 g of stearic acid and 67.3 g of hexamethylenediamine in toluene were heated to 160° C., and the resulting water was separated off. Thereafter, 110 g of methyl isobutyl ketone were added, and removal of the water of reaction was continued. 565 g of an 85% strength by weight toluene solution of an anhydrous diglycidyl ether of 2,2-bis-(4-hydroxyphenyl)-propane and epichlorohydrin, having an equivalent weight of 485, 42 g of diethanolamine and 85 g of toluene were added to the mixture, and the latter was then heated at 100° C. for 4 hours, cooled and then diluted with isobutanol to a solids content of 70% by weight.

Binder 3

Reaction product A 1217.3 g of the butadiene/acrylonitrile copolymer of binder 1, 547.2 g of a dimerized $C_{18}$ fatty acid, 181.6 g of stearic acid and 538.2 g of hexamethylenediamine were dissolved in 809 g of toluene. The water of reaction formed was separated off at 160° C. The solids content was brought to 75% by weight with toluene.

Binder 685.7 g of a diglycidyl ether of 2,2-bis-(4-hydroxyphenyl)-propane and epichlorohydrin, having an equivalent weight of 485 (70% strength by weight in toluene), were heated to 80° C. 36 g of ethylethanolamine were added dropwise, and the mixture was kept at 80° C. for 20 minutes. Thereafter, 405 g of the reaction product described under A were added, and the mixture was kept at 100° C. for a further 2 hours. The solids content was brought to 70% by weight.

Crosslinking Agent 1

504 g of trimerized hexamethylene diisocyanate were dissolved in 382 g of methyl isobutyl ketone, 388 g of dibutylamine were added dropwise at 70° C., while cooling, and the mixture was stirred until the isocyanate value approached zero.

Crosslinking Agent 2

1,340 g of trimethylolpropane, 3,600 g of urea, 3,870 g of dibutylamlne, 1,740 g of hexamethylenediamine and 3,570 g of 3,3'-dimethyl-4,4"-diaminodicyclohexylamine were slowly heated. Above 120° C., ammonia was eliminated and the urea went into solution. The temperature was increased to 155° C. in the course of 2 hours, vigorous reflux taking place and a large amount of a white, crystalline precipitate separating out. After a further 5 hours under reflux, the precipitate had dissolved again and the temperature had reached 165° C. 3,870 g of dibutylamine were then added dropwise in the course of 2 hours and, when the addition was complete, heating was continued for a further 8 hours at 185° C. Thereafter, 3,600 g of dibutylamine were stripped off under reduced pressure at this temperature, and the residue was cooled to 130° C. and diluted with 5,170 g of toluene. The product obtained was a colorless, viscous liquid having a solids content of 70% by weight.

Dispersions

The binder was mixed thoroughly with the crosslinking agent and the acetic acid. Water was then slowly added dropwise. The amounts are summarized in the table below.

| Dispersion | Binder | Amount [g] | Cross-linking agent | Amount [g] | Acetic acid [g] | Water [g] |
|---|---|---|---|---|---|---|
| 1 | 1 | 820 | 1 | 343 | 20 | 1,141 |
| 2 | 1 | 820 | 2 | 343 | 20 | 1,141 |
| 3 | 2 | 820 | 2 | 343 | 21 | 1,133 |
| 4 | 3 | 790 | 2 | 303 | 21 | 1,150 |

Pigment Paste 168.7 g of butylglycol, 600 g of water and 15.7 g of acetic acid were added to 525.8 g of binder 1, followed by 800 g of titanium dioxide, 11.0 g of carbon black and 50 g of basic lead silicate. The mixture was milled in a ball mill to a particle size of $<9$ μm. The solids content was then brought to 49% by weight with water.

Electrocoating Baths 764 g of pigment paste were added to 1980 g of the dispersion (35% strength by weight) and mixed thoroughly, and the mixture was made up to 5,000 g with water. The baths were stirred for 120 hours at 28° C. Coating films were deposited in the course of 120 seconds, at the stated voltage, on zinc-phosphatized steel test panels which had been made the cathode, and the said films were baked for 20 minutes at 170°C. The table below shows the results:

| Coating | Deposition voltage | Bath pH | Throwing power according to Ford | Reverse impact* Nm | 720 hours salt spray test** |
|---|---|---|---|---|---|
| Dispersion 1 | 250 V | 7.3 | 20.0 cm | 18.08 | 0.4 mm |
| Dispersion 2 | 230 V | 7.2 | 19.5 cm | 18.08 | 0.2 mm |
| Dispersion 3 | 320 V | 7.2 | 21.0 cm | 18.08 | 0.3 mm |
| Dispersion 4 | 280 V | 6.9 | 21.0 cm | 18.08 | 0.5 mm |

*The reverse impact was determined using a mandrel impact tester from Gardner, according to ASTM D 2794
**720 hours salt spray test: underpenetration at the crack after exposure to salt spray mist for 720 hours (according to DIN 50,021)

We claim:
1. A binder which is rendered water-dilutable by protonation with an acid, and which is obtainable by reacting the
(A) Reaction product of a
  (a) carboxyl-containing component, consisting of a
    (a1) carboxy-containing butadiene/acrylonitrile copolymer having a molecular weight of from 500 to 8,000, as a mixture with
    (a2) a dicarboxylic acid which differs from a1and has a molecular weight from 90 to 1,000 and,
    (a3) a monocarboxylic acid having a molecular weight of from 140 to 500 and
  (b) a diprimary and/or primary/secondary amine, with the proviso that from 0.7 to 5 moles of the said amine are used per mole of carboxyl groups of component (a),
(B) with one or more epoxy resins having a mean molecular weight from 300 to 6,000 and containing on average from 1.5 to 3.0 epoxide groups per molecule and,
(C) an aliphatic or cycloaliphatic secondary amine.

2. A binder as claimed in claim 1, wherein component (A.a1) is a carboxyl-containing butadiene/acrylonitrile copolymer which contains from 5 to 45% by weight of acrylonitrile units as copolymerized units and possess on average from 1.5 to 2.5 carboxyl groups in the copolymer molecule.

3. A binder as claimed in claim 1, wherein the carboxyl-containing butadiene/acrylonitrile copolymer (A.a1) carries terminal carboxyl groups.

4. A binder as claimed in claim 1, wherein the dicarboxylic acid used as component (A.a2) is a dimerized $C_{12}$–Chd 24-fatty acid (dimer fatty acid).

5. A binder as claimed in claim 1, wherein the secondary amine (C) is a dialkylamine which contains 2 to 18 carbon atoms.

6. A binder as claimed in claim 5, wherein the alkyl chains of the secondary amine (C) carry primary amino groups.

7. A process for the preparation of a binder as claimed in claim 1, wherein
(A) by means of a condensation reaction, a
  (a) carboxyl-containing component, consisting of a
    (a1) carboxy-containing butadiene/acrylonitrile copolymer having a molecular weight of from 500 to 8,000 as a mixture with
    (a2) a dicarboxylic acid which differs from a1) and has a molecular weight of from 90 to 1,000 and,
    (a3) a monocarboxylic acid having a molecular weight of from 140 to 500,
  is reacted, at up to 200°C., with removal of the water of reaction by distillation, with a
  (b) diprimary and/or primary/secondary amine, with the proviso that from 0.7 to 5 moles of the diprimary and/or primary/secondary amine are used per mole of carboxyl groups of component (a), and this condensate is reacted with
(B) one or more epoxy resins having a mean molecular weight of from 300 to 6,000 and possessing on average from 1.5 to 3.0 epoxide groups per molecule, and,
(C) an aliphatic or cycloaliphatic secondary amine, at 40°–180° C.

* * * * *